United States Patent
Steinnagel

(10) Patent No.: US 7,621,585 B2
(45) Date of Patent: Nov. 24, 2009

(54) WINDOW ASSEMBLY FOR A MOTOR VEHICLE

(75) Inventor: Wolfgang Steinnagel, Weissach (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 657 days.

(21) Appl. No.: 11/154,557

(22) Filed: Jun. 17, 2005

(65) Prior Publication Data

US 2005/0284047 A1    Dec. 29, 2005

(30) Foreign Application Priority Data

Jun. 18, 2004    (DE) ...................... 10 2004 029 620

(51) Int. Cl.
*B60J 10/02*    (2006.01)
(52) U.S. Cl. .................. 296/146.15; 296/93; 296/96.21
(58) Field of Classification Search ............ 296/146.15, 296/93, 96.21; 52/204.597
See application file for complete search history.

(56) References Cited

U.S. PATENT DOCUMENTS

| | | | |
|---|---|---|---|
| 4,505,511 A | | 3/1985 | Hänle et al. |
| 4,974,901 A | * | 12/1990 | Katayama ................... 296/201 |
| 5,283,100 A | * | 2/1994 | Yui et al. .................... 428/120 |
| 5,311,711 A | | 5/1994 | Desir, Sr. |
| 5,388,087 A | * | 2/1995 | Saiki et al. ............... 369/47.26 |
| 5,538,314 A | * | 7/1996 | Young et al. ........... 296/146.15 |
| 5,603,546 A | * | 2/1997 | Desir, Sr. .................... 296/93 |
| 5,624,148 A | * | 4/1997 | Young et al. ................. 296/93 |
| 5,803,527 A | * | 9/1998 | Fujiya ........................ 296/93 |
| 6,227,598 B1 | | 5/2001 | Ichioka et al. |
| 6,241,306 B1 | * | 6/2001 | Adorni et al. .......... 296/146.15 |
| 6,293,609 B1 | * | 9/2001 | Xu et al. ................. 296/146.15 |
| 6,406,785 B1 | * | 6/2002 | Janes et al. ................. 428/327 |
| 6,451,411 B1 | * | 9/2002 | Riley .......................... 428/156 |
| 6,460,300 B2 | * | 10/2002 | Mikkaichi et al. ....... 52/204.597 |
| 6,487,823 B2 | * | 12/2002 | Lagrue ........................ 52/208 |
| 6,719,351 B2 | * | 4/2004 | Cornils et al. .................. 296/93 |
| 6,722,731 B2 | | 4/2004 | Cornils et al. |
| 6,769,700 B2 | * | 8/2004 | Ortmuller et al. ........... 277/642 |
| 6,971,702 B2 | * | 12/2005 | Boettger et al. ............... 296/93 |
| 7,059,656 B2 | * | 6/2006 | Mikkaichi et al. ....... 296/146.15 |
| 7,210,729 B2 | * | 5/2007 | Hammaker et al. .... 296/146.15 |

(Continued)

FOREIGN PATENT DOCUMENTS

DE    36 02 198 C1    4/1987

(Continued)

*Primary Examiner*—Glenn Dayoan
*Assistant Examiner*—Gregory Blankenship
(74) *Attorney, Agent, or Firm*—RatnerPrestia

(57) ABSTRACT

A window assembly for a motor vehicle includes a sheet and a sealing element for a fixed window to be secured to the edge portion of a section of the vehicle body. The sealing element features a bonding portion, which is bonded to the inside of the sheet, and includes a sealing lip projecting from the bonding portion, which can be brought into contact with the edge portion of the vehicle body section. To facilitate repainting of the edge portion of the vehicle body section the sealing lip, over its length, features at least a first and second layer, which are arranged one over the other and are tightly bonded to one another. The first layer forms an external surface layer and exhibits a higher temperature resistance than the second layer.

9 Claims, 3 Drawing Sheets

U.S. PATENT DOCUMENTS

2003/0006623 A1    1/2003    Cornils et al.

FOREIGN PATENT DOCUMENTS

| | | |
|---|---|---|
| DE | 199 61 706 A1 | 7/2001 |
| EP | 0 099 460 B1 | 2/1984 |
| EP | 0 601 693 A1 | 6/1994 |
| EP | 0 955 197 A1 | 11/1999 |
| GB | 1014924 | 9/1962 |

* cited by examiner

WINDOW ASSEMBLY FOR A MOTOR VEHICLE

This application claims the priority of German application 10 2004 029 620.0, filed Jun. 18, 2004, the disclosure of which is expressly incorporated by reference herein.

BACKGROUND AND SUMMARY OF THE INVENTION

The present invention relates to a window assembly for a motor vehicle including an automotive window and a sealing element for the window to be bonded to an edge portion of a window aperture, in which the sealing element features a mounting portion adapted to be bonded to the inside of the window, and in which the sealing element includes a sealing lip, projecting from the mounting portion, which can be brought in contact with an edge of the window aperture.

A prior art window assembly is known from German document DE 199 61 706 A1. The window assembly comprises a sheet and a sealing element which is secured to the inside of the sheet via a mounting portion. The sheet is bonded with an adhesive seam to an edge portion of a section of the vehicle body enclosing the fixed window. An elastic sealing lip projects from the mounting portion, and the mounting portion and the sealing lip are made of synthetic materials. However, below the mounting portion, an additional supporting element extruded from another synthetic material can be present. When the window assembly is installed in vehicle body section, the free end of the sealing lip rests on the edge portion of the vehicle body section.

German document DE 36 02 198 C1 describes a window assembly in which a seal encompassing the edge of an automotive window sheet serves to secure the window assembly in place until an adhesive seam is hardened.

European document EP 99 460 B1 discloses a window assembly including an automotive window sheet and a seal secured to the edge of the window sheet with a mounting portion and an elastic sealing lip projecting therefrom. The sealing lip is connected to the mounting portion via a flexible bridge, thereby enabling the sealing lip to be pried from a gap present between the edge of the window and the edge of the vehicle body section to allow, for example, the edge portion of the vehicle body to be repainted.

One object of the invention is to optimize a window assembly of the type described above.

The invention teaches that this object can be achieved by providing a window assembly in which, over its length, the sealing lip has at least a first layer and a second layer which are placed adjacent to each other and which are tightly bonded to one another, and in which the first layer forms an external surface layer and features a higher resistance to temperature than the second layer, which underlies the first layer. Further embodiments and features of the invention are also claimed.

Advantages achieved through the invention include permitting repainting of the edge portion of a vehicle body section followed by subsequent heat treatment for drying the applied coating to be performed without the external appearance of the external surface layer of the sealing lip being significantly compromised by temperatures normally used in the paint drying process. The properties of the second layer below the external surface layer can be adjusted to meet the desired sealing properties.

Through the presence of at least two layers, the resiliency of the sealing lip can be optimized, allowing it to rest securely on the edge of the vehicle body section. This property can be achieved by making the external surface layer of a harder material than the second layer since the harder synthetic material can provide sufficient resiliency.

In a preferred embodiment, the mounting portion of the sealing element is a bearing designed to rest on the edge portion of the window aperture, and the window assembly can be mounted on the edge portion of the vehicle body as a prefabricated assembly. In this option, the bearing also serves to create space between the automotive window sheet and the edge portion of the vehicle body to allow an adhesive seam to be placed therein.

The assembly, including an automotive window sheet and a sealing element, can be temporarily secured to the edge portion of the vehicle body by way of a self-adhesive strip on a bonding surface of the bearing that is to make contact with the edge portion of the window aperture. The self-adhesive strip, in this case, holds the window assembly in the desired position until the adhesive seam is sufficiently hardened and the window assembly is permanently fixed into position and secured to the edge portion of the vehicle body.

According to one embodiment, in which the bearing is bonded to an inside of the automotive window with a self-adhesive strip, the assembly can be manufactured in a simple and economical manner by combining an automotive window sheet with a sealing element.

In a particularly advantageous embodiment, the sealing lip has a notch on its contact surface facing an edge of the automotive window. If the sealing lip rests with elasticity against the edge portion of the vehicle body section, it can be stretched sufficiently far in the direction of the edge of the automotive window sheet that the edge lies in the notch, thereby making additional sealing and weather-stripping components unnecessary.

An embodiment of the invention is described in further detail below with reference to the illustrations.

DETAILED DESCRIPTION OF THE INVENTION

Figure 1:
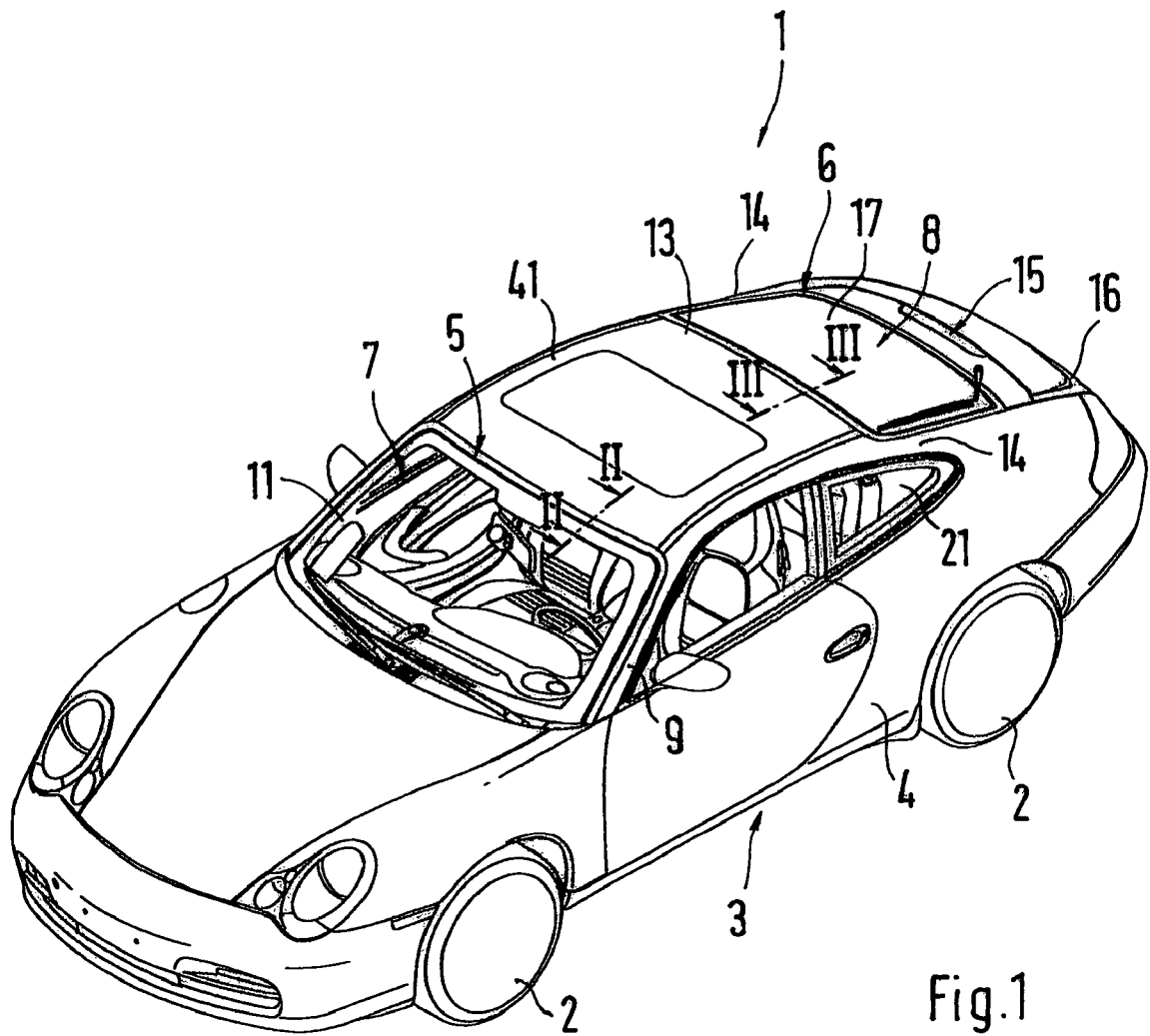
FIG. 1 is a perspective view of a motor vehicle showing forward and aft window assemblies.
Figure 2:
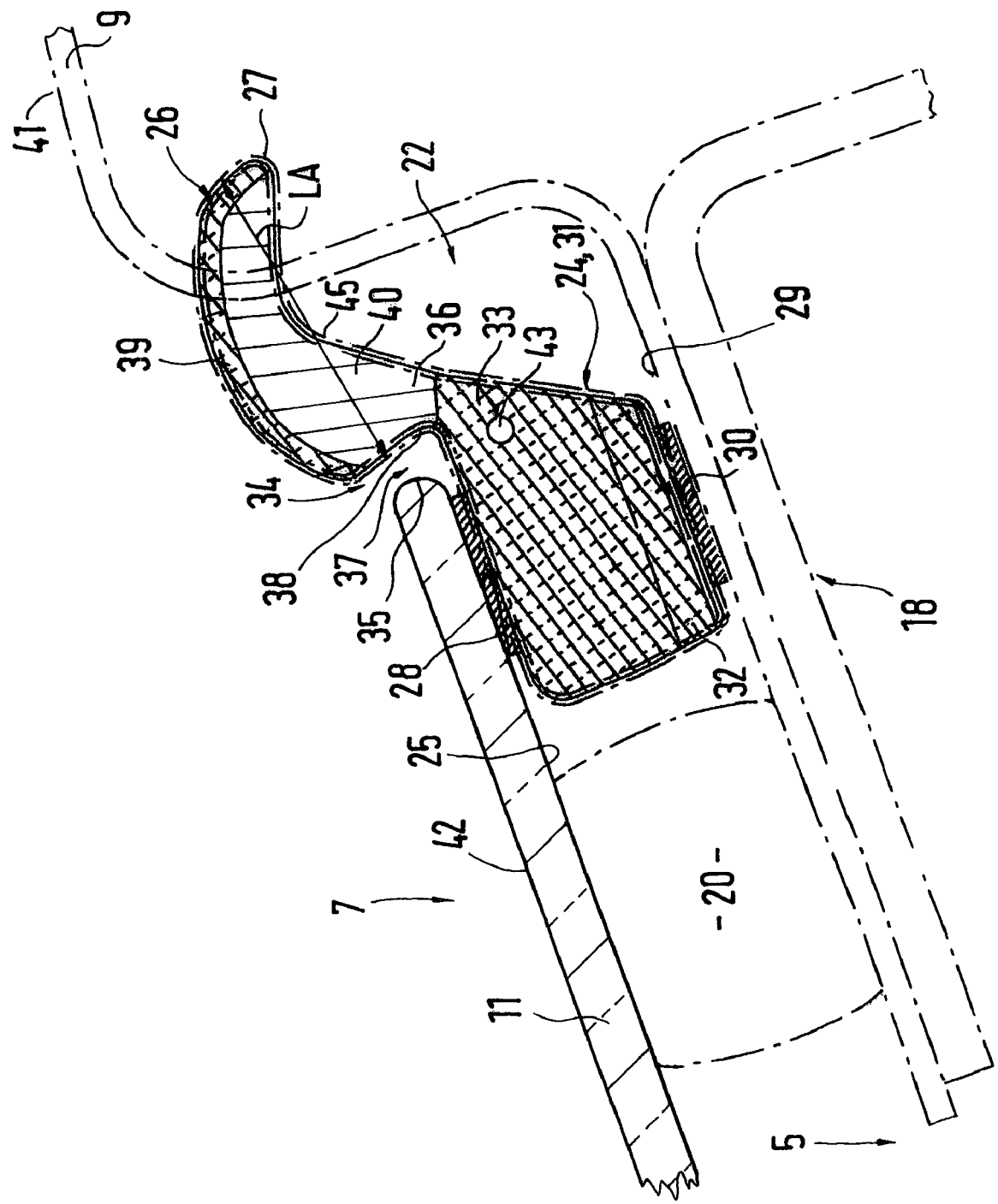
FIG. 2 is a view of a detail of the forward window assembly along the line II-II of FIG. 1.
Figure 3:
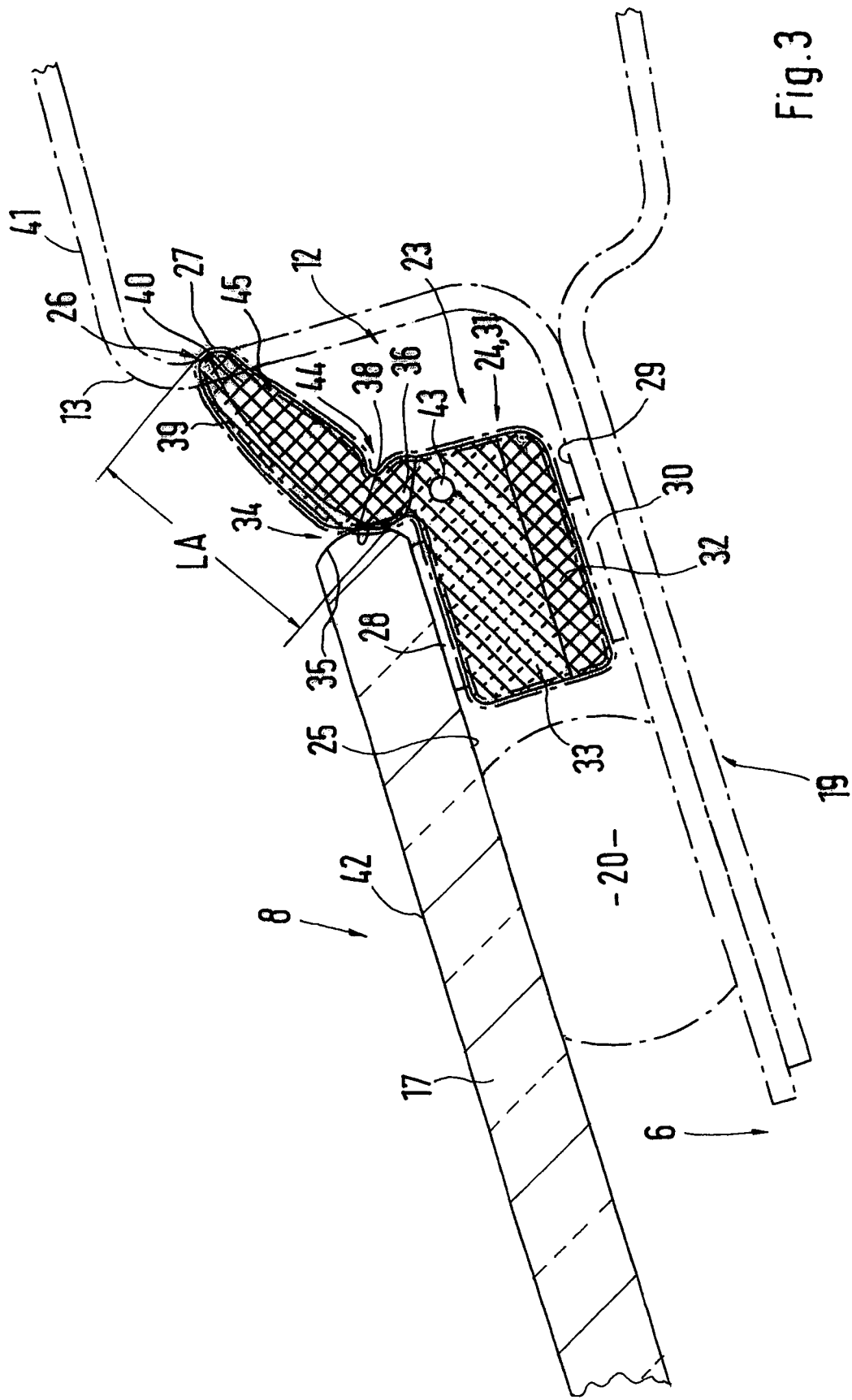
FIG. 3 is a detail of the aft window assembly along the line III-III of FIG. 1.

A motor vehicle 1 illustrated in FIG. 1, in particular a passenger car, features a vehicle chassis 3 supported by wheels 2 with an automotive vehicle body 4, which has one or more window apertures 5 and 6. A window assembly 7 or 8 can be mounted in a respective window aperture. In the illustrated embodiment of the motor vehicle 1, the perimeter of the forward window aperture 5 is encompassed by a windshield cowl 9, with the windshield cowl 9 forming the edge (FIG. 2) of the window aperture 5. The forward window assembly 7 comprises the windshield 11. The aft window assembly 8 is mounted in the aft window aperture 6. The window aperture is framed by an edge portion (FIG. 3), which comprises an aft roof edge 13, side pillars 14, particularly C-pillars, and a tail portion 15, particularly a fixed tail sheet, wherein a rear hatch 16 can be present. The aft window assembly 8 comprises a rear window 17. As FIGS. 2 and 3 illustrate, the edge portion of the vehicle body features a flange 18 or 19, which borders its respective window aperture 5 or 6 and in which the window assembly 7 or 8 with the automotive window sheet 11 or 17 (windshield or rear window) is set and secured to the vehicle body 3 through the interposition of an adhesive seam 20. In this example, the automotive window sheets 11 and 17 are illustrated as fixed. It is possible to categorically apply the window assembly 7 or 8, as described below, to other fixed windows in the motor vehicle 1, for example, rear side windows 21.

Each window assembly 7 or 8 features an automotive window sheet 11 or 17 and a sealing element 22 or 23, which contains a plurality of portions, whereby a mounting portion 24 of the element is placed between the inside 25 of the automotive window sheet 11 or 17 and the edge portion of the vehicle body 12 and whereby another portion of the sealing element 22 or 23 forms an elastic sealing lip 26, which projects from the mounting portion 24 and rests with its free end 27 on the edge portion of the vehicle body 12.

The mounting portion 24 is attached on one side to the inside 25 of the automotive window sheet 11 or 17 preferably through a self-adhesive adhesive strip 28 introduced between the inside 25 and the mounting portion 24. The adhesive strip 28 is realized as a double-sided adhesive tape. At the other end, an additional self-adhesive adhesive strip 30 is introduced between the mounting portion 24 and a bonding surface 29 of the edge 12. The adhesive strip 30 is also realized as a double-sided adhesive tape. The bonding surface 29 is preferably located on the flange 18 or 19. When the window assembly 7 or 8 is used in its respective window aperture 5 or 6, the sealing element 22 or 23 is already secured to the inside 25, so that the automotive window sheet and the sealing element form a prefabricated assembly. It is preferable that, prior to installing the window assembly 7 or 8 in the window aperture 5 or 6, the adhesive seam 20 has already been installed on the bonding surface 29 robotically. When the window assembly 7 or 8 is installed in the window aperture 5 or 6, the automotive window sheet 11 or 17 is held in place and temporarily secured by means of the self-adhesive strip 30 placed on the mounting portion until the adhesive seam 20 introduced between the inside 25 and the bonding surface 29 has hardened, thereby facilitating the permanent attachment of the window assembly 7 or 8 to the edge portion of the vehicle body 12. The mounting portion 24 thereby forms a bearing 31 for the automotive window sheet 11 or 17, so that the automotive window sheet 11 or 17 can be rested against the edge portion of the vehicle body 12 and be placed at the desired distance between the inside 25 and the bonding surface 29, particularly until the adhesive seam 20 has hardened. The mounting portion 24 is realized as an at least two-layered body with a first layer 32 and a second layer 33, with the layers 32 and 33 arranged one over the other and made of materials of differing hardness. The first layer 32 is composed of a material, particularly a synthetic material, preferably EPDM, which is softer than the second material, particularly a synthetic material, preferably EPDM, used in the second layer 33.

Projecting from the mounting portion 24 is a sealing lip, which extends through a gap 34 running between a window edge 35 and the edge 12 of the respective window aperture 5 or 6. In FIGS. 2 and 3, the sealing lip 26 is shown in a relaxed state. In the actual post-assembly position, the sealing lip 26 rests on the edge portion of the vehicle body 10 or 12 with its free end 27 up. In the embodiment shown, the sealing lip 26 of the upper, second layer 33 preferably projects from the mounting portion 24 or is connected thereto. An additional bonding projection 36 can be placed between the sealing lip 26 and the mounting portion 24. The sealing lip 26 and/or the bonding projection 36 feature a notch 37, which is introduced to the contact surface 38 of the sealing lip 26 or the bonding projection 36 facing the automotive window sheet edge 35. The automotive window sheet edge 35 rests in the notch 37 when the sealing lip 26 is present in its proper post-assembly position. Therefore, the automotive window sheet edge 35 and the edge portion of the vehicle body 12 are covered at least partly by the sealing lip 26.

Over the length LA spanning between the free end 27 and the contact surface 38, the sealing lip 26 is designed to be multi-layered, particularly double-layered; featuring at least two layers 39 and 40 arranged one over the other. The first layer 39 forms a surface layer, which covers the side of the sealing lip 26 on the automobile exterior 41 (FIG. 1). The second layer lies beneath the first layer 39 and faces the edge portion of the vehicle body 12. Both layers 39 and 40 are securely bonded to one another. The bonding projection 36 is shown as being one piece with the second layer. The layers forming the elastic sealing lip are each made of differing material, wherein a first material, particularly a synthetic material, preferably EPDM, is used for the surface layer (layer 39). A second material, particularly a synthetic material, preferably EPDM, is used for the second layer 40, and the surface layer features at least a higher temperature resistance, thereby preventing damage to the surface layer, particularly changes to its surface composition, when heat treatment is applied to the vehicle body 4. For heat treating, temperatures can be selected that are typically used for the drying of the coatings (not illustrated) applied to the outside of the vehicle body 4. Temperatures can be set up to 160° C., or higher if necessary. For example, in preparation for the repainting of the edge portions 12, the sealing lip 26 can be removed from its contact with the edge portion of the vehicle body 12 and folded onto an outer surface 42 of the automotive window sheet 11 or 12 to allow free access to the edge portion of 12 for the application of paint or coatings. Following the completion of heat treatment, the sealing lip 26 can be returned to its proper post-assembly position, where it serves to cover the gap 34.

The first material for the first layer 32 of the bearing 31 or the mounting portion 24 and the first material for the surface layer (layer 39) of exterior portion 45 of the sealing lip 26 are preferably identical. The same is true of the second material for the second layer 40 of exterior portion 45 of the sealing lip 26 and the second layer 33 of the bearing 31 or the mounting portion 24, so that the first material exhibits both a higher temperature resistance and also a greater hardness. As can be seen particularly in FIGS. 2 and 3, the external surface layer does not span into the area of the bonding projection 36 or into the contact surface, but rather ends shortly before, thereby allowing the sealing lip 26 to be rolled in the direction of the outer surface 42.

The sealing element 22 or 23 with its respective mounting portion 24 and the sealing lip 26 can, for example, be manufactured as a two-component part from the first and second material, particularly through extrusion. During the manufacture of the sealing element 22 or 23, a virtually inductile stabilization thread 43 can be introduced into the mounting portion 24. The sealing element 22 or 23 is preferably designed to be continuous with the window edge 35. As an alternative option, it can be designed to make contact with the window edge 35 only at particular points along its perimeter.

Opposite to what is shown in the embodiment illustrated in FIG. 2, the automotive window sheet 11 can be realized as multi-sheet glass. A double-sheet safety glass can be used. In this configuration, the sealing lip 26 could be joined via its contact surface 38 to the external automotive window sheet or edge thereof, both of which are not illustrated.

In the embodiment as illustrated in FIG. 3, the sealing lip 26 features a slit 44, which can be introduced to the exterior portion 45 of the sealing lip 26, particularly the second layer 40 thereof facing the edge portion 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A window assembly for a motor vehicle comprising:
   an automotive window, and
   a sealing element for the window to be bonded to an edge portion of a window aperture,
   wherein the sealing element features a mounting portion, which is adapted to be bonded to the inside of the window,
   wherein the sealing element includes a sealing lip, projecting from the mounting portion, which can be brought in contact with an edge of the window aperture,
   wherein, over its length, the sealing lip has at least a first layer and a second layer which are placed adjacent to each other and which are tightly bonded to one another,
   wherein the first layer forms an external surface layer and features a higher resistance to temperature than the second layer, which underlies the first layer,
   wherein the mounting portion defines a bearing formed of at least two layers of differing hardness arranged adjacent to each other,
   wherein a lower layer of the bearing is softer than an upper, overlying layer of the bearing,
   wherein the second layer of the sealing lip projects from the upper, overlying layer, and
   wherein the sealing lip is bonded to the bearing via a bonding projection, and wherein the bonding projection and the second layer of the sealing lip are one piece.

2. The window assembly as claimed in claim 1, wherein the bearing is designed to rest on the edge portion of the window aperture.

3. The window assembly as claimed in claim 2, wherein the bearing features a self-adhesive strip on a bonding surface that is to make contact with the edge portion of the window aperture.

4. The window assembly as claimed in claim 3, wherein the self-adhesive strip is double-sided adhesive tape.

5. The window assembly as claimed in claim 1, wherein the bearing is bonded to an inside of the automotive window with a self-adhesive strip.

6. The window assembly as claimed in claim 1, wherein the sealing element includes a continuous stabilizing thread.

7. The window assembly as claimed in claim 1, wherein the sealing lip has a notch on its contact surface facing an edge of the automotive window.

8. The window assembly as claimed in claim 1, wherein the harder material is a synthetic material.

9. The window assembly as claim in claim 5, wherein the self-adhesive strip is double-sided adhesive tape.

* * * * *